(12) United States Patent
Fukuzono et al.

(10) Patent No.: US 11,929,797 B2
(45) Date of Patent: Mar. 12, 2024

(54) WIRELESS COMMUNICATION SYSTEM, WIRELESS COMMUNICATION METHOD, AND TRANSMISSION DEVICE

(71) Applicant: NIPPON TELEGRAPH AND TELEPHONE CORPORATION, Tokyo (JP)

(72) Inventors: Hayato Fukuzono, Musashino (JP); Keita Kuriyama, Musashino (JP); Masafumi Yoshioka, Musashino (JP); Takafumi Hayashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 14 days.

(21) Appl. No.: 17/797,758

(22) PCT Filed: Mar. 2, 2020

(86) PCT No.: PCT/JP2020/008747
§ 371 (c)(1),
(2) Date: Aug. 5, 2022

(87) PCT Pub. No.: WO2021/176533
PCT Pub. Date: Sep. 10, 2021

(65) Prior Publication Data
US 2023/0070849 A1    Mar. 9, 2023

(51) Int. Cl.
*H04K 1/10*         (2006.01)
*H04B 7/0413*       (2017.01)
(Continued)

(52) U.S. Cl.
CPC ....... *H04B 7/0413* (2013.01); *H04L 25/0202* (2013.01); *H04L 27/2607* (2013.01)

(58) Field of Classification Search
CPC .. H04B 7/0413; H04B 7/0617; H04B 7/0452; H04B 7/08; H04L 25/0202;
(Continued)

(56) References Cited

U.S. PATENT DOCUMENTS 9,385,819 B2 *   7/2016  Yoshimoto .......... H04B 7/0452
2010/0046661 A1 *  2/2010  Yoshida ............... H04B 7/0854
                                                            375/285
(Continued)

OTHER PUBLICATIONS

Hayato Fukuzono et al., "An Adaptive CP-Length Scheme on Multiuser MIMO-SC-FDE Systems with FIR-Transmit Beamforming", Proceedings 1 of the IEICE Communication Society Conference, B-5-62 p. 316, (Sep. 2019).
(Continued)

*Primary Examiner* — Phuong Phu
(74) *Attorney, Agent, or Firm* — Harness, Dickey & Pierce, P.L.C.

(57) ABSTRACT

A transmission apparatus including the number of antennas different from a reception apparatus and performing transmission by SC-MIMO to and from the reception apparatus includes a training signal generation unit that generates a known signal predetermined, a CP addition unit that adds a CP to each symbol of a transmission signal including the known signal, a weight generation unit that multiplies a channel matrix estimated based on the known signal by the reception apparatus by a pseudo-inverse matrix obtained by a predetermined number of iterative calculations to generate a transmission weight that is diagonalizable, and a transmission beam formation unit that uses the transmission weight to form a transmission beam for the transmission signal where the CP is added.

3 Claims, 4 Drawing Sheets

(51) Int. Cl.
  *H04L 25/02* (2006.01)
  *H04L 27/26* (2006.01)
  *H04L 27/28* (2006.01)

(58) Field of Classification Search
  CPC ............. H04L 27/2607; H04L 25/0212; H04L 5/0007; H04L 25/0222
  USPC .......................... 375/260, 267, 299, 346, 347
  See application file for complete search history.

(56) References Cited

U.S. PATENT DOCUMENTS

| | | | |
|---|---|---|---|
| 2011/0044383 A1* | 2/2011 | Maruyama | H04L 25/0222 375/232 |
| 2020/0195393 A1* | 6/2020 | Alsuhaili | H04L 5/0007 |
| 2022/0329289 A1* | 10/2022 | Huang | H04B 7/0617 |
| 2023/0055133 A1* | 2/2023 | Fukuzono | H04L 25/0212 |

OTHER PUBLICATIONS

A. Ben-Israel et al., "Generalized Inverses: Theory and Applications", Springer-Verlag New York, p. 220, (2003).

* cited by examiner

WIRELESS COMMUNICATION SYSTEM, WIRELESS COMMUNICATION METHOD, AND TRANSMISSION DEVICE

CROSS-REFERENCE TO RELATED APPLICATIONS

This application is a 371 U.S. National Phase of International Application No. PCT/JP2020/008747, filed on Mar. 2, 2020. The entire disclosure of the above application is incorporated herein by reference.

TECHNICAL FIELD

The present disclosure relates to a wireless communication system, a wireless communication method, and a transmission apparatus.

BACKGROUND ART

A technology for performing a broadband single carrier (SC)-multiple-input multiple-output (MIMO) transmission in a communication environment with frequency-selective fading is known.

For example, a technology for forming a transmission beam having a cyclic prefix (CP) added thereto using a finite impulse response (FIR) in SC-MIMO in which the number of transmission antennas is the same as the number of reception antennas is known (see, for example, NPL 1). Here, a MIMO channel matrix is a square matrix.

Further, a Ben-Israel equation for deriving a pseudo-inverse matrix through iterative calculations is known (for example, see NPL 2).

CITATION LIST

Non Patent Literature

NPL 1: Hayato Fukuzono and 3 others, "An Adaptive CP-Length Scheme on Multiuser MIMO-SC-FDE Systems with FIR-Transmit Beamforming", 2019, The Institute of Electronics, Information and Communication Engineers Communication Society Conference, Proceedings of Communication Lecture 1, September 2019, B-5-62

NPL 2: A. Ben-Israel et al., "Generalized Inverses: Theory and Applications", Springer-Verlag New York, 2003. p. 220

SUMMARY OF THE INVENTION

Technical Problem

However, when a transposed adjugate matrix is used to generate a transmission weight, the transposed adjugate matrix is defined only as a square matrix and thus, the related art is not applicable when the number of transmission antennas differs from the number of reception antennas. That is, there is a problem that the related art cannot be applied to a non-square MIMO channel matrix.

An object of the present disclosure is to provide a wireless communication system, a wireless communication method, and a transmission apparatus capable of forming an FIR transmission beam and removing symbol interference even when the number of transmission antennas differs from the number of reception antennas.

Means for Solving the Problem

A wireless communication system according to an aspect of the present disclosure is a wireless communication system for performing transmission by SC-MIMO between a transmission apparatus including a plurality of antennas and a reception apparatus including the number of antennas different from the number of antennas of the transmission apparatus, in which the transmission apparatus includes a training signal generation unit that generates a known signal predetermined, a CP addition unit that adds a CP to at least one symbol of a transmission signal including the known signal, and a transmission beam formation unit that uses a transmission weight to form a transmission beam for the transmission signal where the CP is added, the reception apparatus includes a CP removal unit that removes the CP added to a reception signal, a channel estimation unit that estimates a channel matrix based on the known signal, and an equalization unit that performs equalization processing on the reception signal where the CP is removed, and the transmission apparatus or the reception apparatus further includes a weight generation unit that multiplies the channel matrix by a pseudo-inverse matrix obtained by a predetermined number of iterative calculations to generate the transmission weight that is diagonalizable.

A wireless communication method according to an aspect of the present disclosure is a wireless communication method for performing transmission by SC-MIMO between a transmission apparatus including a plurality of antennas and a reception apparatus including the number of antennas different from the number of antennas of the transmission apparatus, the wireless communication method including generating, by the transmission apparatus, a known signal predetermined, adding, by the transmission apparatus, a CP to at least one symbol of a transmission signal including the known signal, removing, by the reception apparatus, the CP added to a reception signal, estimating, by the reception apparatus, a channel matrix based on the known signal, multiplying, by the transmission apparatus or the reception apparatus, the channel matrix by a pseudo-inverse matrix obtained by a predetermined number of iterative calculations to generate a transmission weight that is diagonalizable, using, by the transmission apparatus, the transmission weight to form a transmission beam for the transmission signal where the CP is added, and performing, by the reception apparatus, equalization processing on the reception signal where the CP is removed.

A transmission apparatus according to an aspect of the present disclosure is a transmission apparatus including the number of antennas different from a reception apparatus and performing transmission by SC-MIMO to and from the reception apparatus, the transmission apparatus including a training signal generation unit that generates a known signal predetermined, a CP addition unit that adds a CP to at least one symbol of a transmission signal including the known signal, a weight generation unit that multiplies, by a pseudo-inverse matrix obtained by a predetermined number of iterative calculations, a channel matrix estimated based on the known signal by the reception apparatus to generate a transmission weight that is diagonalizable, and a transmission beam formation unit that uses the transmission weight to form a transmission beam for the transmission signal where the CP is added.

Effects of the Invention

According to the present disclosure, even when the number of transmission antennas differs from the number of reception antennas, it is possible to form an FIR transmission beam and remove symbol interference.

DESCRIPTION OF EMBODIMENTS

Figure 1:
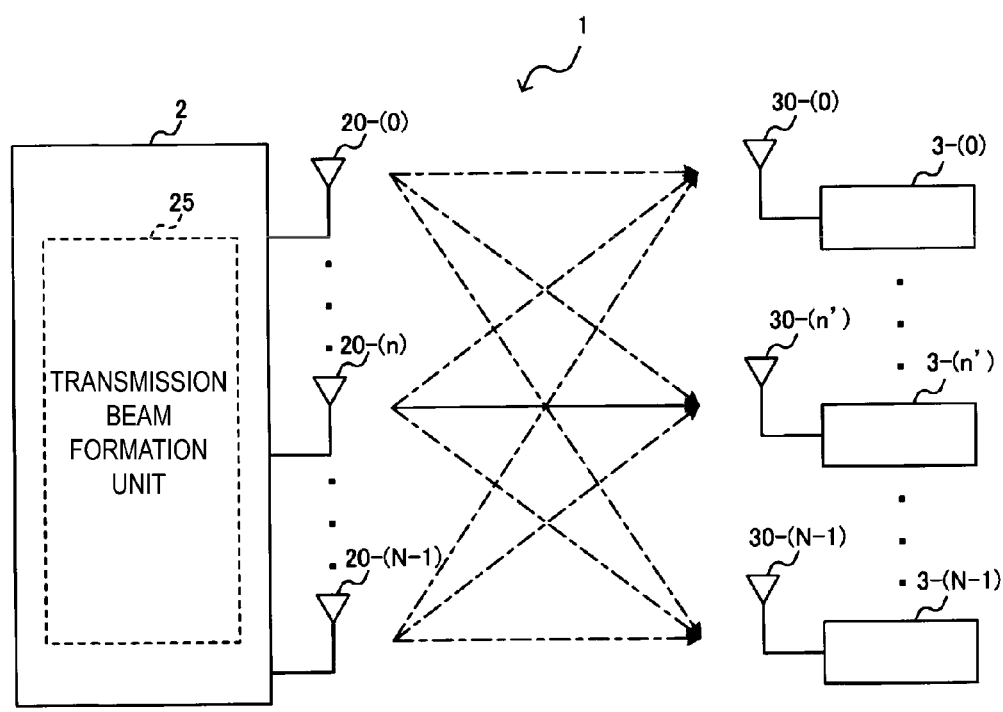
FIG. 1 is a diagram illustrating a configuration example of a wireless communication system according to an embodiment.

Hereinafter, an embodiment of a wireless communication system will be described with reference to the drawings. FIG. 1 is a diagram illustrating a configuration example of the wireless communication system 1 according to the embodiment. As illustrated in FIG. 1, the wireless communication system 1 includes, for example, one transmission apparatus 2 and N reception apparatuses 3-(0) to 3-(N−1), and performs transmission based on SC-MIMO between the transmission apparatus 2 and the reception apparatuses 3-(0) to 3-(N−1). n and n' are any integers from 0 to N−1.

The transmission apparatus 2 includes, for example, N antennas 20-(0) to 20-(N−1), and transmits a transmission signal having a CP added thereto from the antennas 20-(0) to 20-(N−1) using an FIR transmission beam formed by a transmission beam formation unit 25 to be described below.

It is assumed that the reception apparatuses 3-(0) to 3-(N−1) include, for example, N antennas 30-(0) to 30-(N−1), one each, and are users each receiving beams transmitted from the antennas 20-(0) to 20-(N−1) by the transmission apparatus 2.

Hereinafter, when any one of a plurality of configurations like the reception apparatuses 3-(0) to 3-(N−1) is not specified, the reception apparatuses are simply abbreviated as the reception apparatus 3 or the like.

The wireless communication system 1 is not limited to the number of antennas 20 included in the transmission apparatus 2 being the same as the number of reception apparatuses 3 (the number of antennas 30). First, a case in which the number (N) of antennas 20 included in the transmission apparatus 2 is the same as the number (N) of reception apparatuses 3 will be described as a first operation example of the wireless communication system 1. Thereafter, a case in which the number (N) of antennas 20 included in the transmission apparatus 2 differs from the number (M) of reception apparatuses 3 will be described as a second operation example of the wireless communication system 1.

First Operation Example

Figure 2:
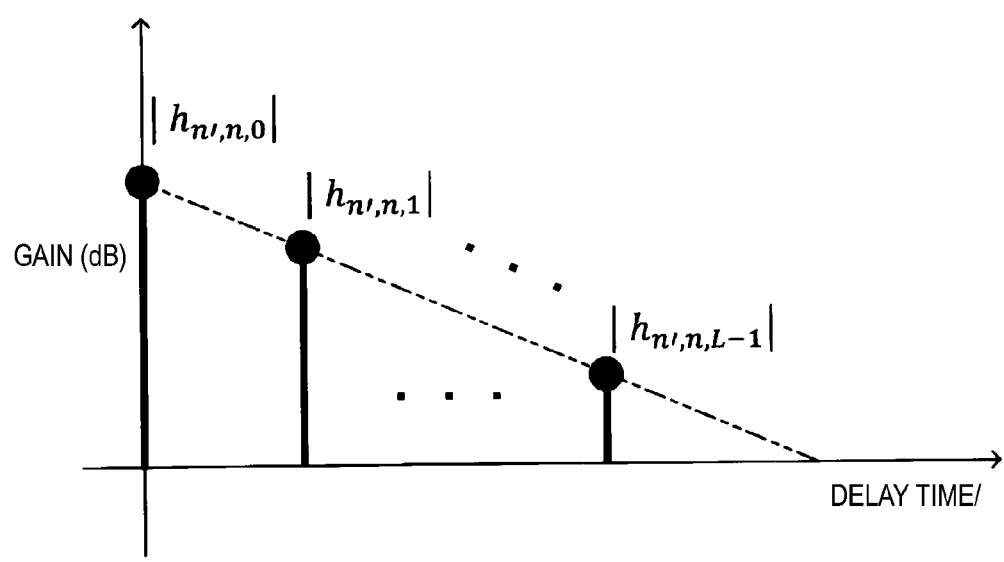
FIG. 2 is a diagram illustrating a delay profile.

First, the first operation example of the wireless communication system 1 will be described. FIG. 2 is a diagram illustrating a delay profile in the first operation example between an antenna 20-($n$) of the transmission apparatus 2 and an antenna 30-($n'$) of the reception apparatus 3-($n'$) illustrated in FIG. 1. L (L: a positive integer) is a channel impulse response (CIR) length of a CIR having delay waves with a maximum delay among CIRs.

Delay times 0, 1, . . . , L−1 correspond to an order of a delay operator, which will be described below. Further, $|h_{n',n,0}|$ indicates a gain (dB) of the delay time with order 0.

Similarly, $|h_{n',n,1}|$ indicates a gain of the delay time with order 1, and $|h_{n',n,L-1}|$ indicates a gain of the delay time with order (L−1), respectively.

Here, CIR($H_{n',n}(z)$) between the antenna 20-($n$) of the transmission apparatus 2 and the antenna 30-($n'$) of the reception apparatus 3-($n'$) is expressed by Equation (1) below. In Equation (1) below, z in $z^{-1}$ is a delay operator that performs time shift.

[Math. 1]

$$H_{n',n}(z) = \sum_{l=0}^{L-1} h_{n',n,l} z^{-l} \quad (1)$$

A CIR in the MIMO channel between the transmission apparatus 2 and the reception apparatus 3 is expressed by a transfer function determinant H(z) of N×N having a CIR between the antennas of Equation (1) above as an element, as illustrated in Equation (2) below.

[Math. 2]

$$H(z) = \begin{bmatrix} H_{0,0}(z) & H_{0,1}(z) & \dots \\ H_{1,0}(z) & & \\ \vdots & & \end{bmatrix} \quad (2)$$

Here, an inverse matrix of H(z) is expressed by Equation (3) below using a transposed adjugate matrix adj[H(z)] of H(z).

[Math. 3]

$$H(z)^{-1} = \frac{1}{|H(z)|} adj[H(z)] \quad (3)$$

In Equation (3) above, |•| (=det(•)) and adj(•) indicate a determinant and a transposed adjugate matrix, respectively. Here, adj differs from a transposed adjoint matrix indicating Hermitian transposition.

The transposed adjugate matrix adj[H(z)] is used as a transmission weight W(z) in transmission beam formation processing so that a channel response determinant H(z) is diagonalized and each of diagonal elements is equal to a determinant det[H(z)], as well known.

A channel response obtained by performing the transmission beam formation processing with adj[H(z)] as the transmission weight W(z) is equivalently expressed by Equation (4) below. Here, I is an identity matrix.

[Math. 4]

$$H(z)W(z) = |H(z)|I = \begin{bmatrix} |H(z)| & 0 & \dots & 0 \\ 0 & \ddots & \ddots & \vdots \\ \vdots & \ddots & \ddots & 0 \\ 0 & \dots & 0 & |H(z)| \end{bmatrix} \quad (4)$$

Thus, the transmission beam formation processing is performed with adj[H(z)] as the transmission weight W(z), so that the channel response determinant H(z) is diagonalized and a non-diagonal component indicating an inter-user interference component becomes 0, thus removing the inter-user interference.

The reception apparatus 3 performs equalization processing using det[H(z)] to remove inter-symbol interference.

Here, a case of 3×3 MIMO will be described as an example. The channel response determinant H(z) of 3×3 MIMO in Equation (3) above is expressed by Equation (5) below.

[Math. 5]

$$H(z) = \begin{bmatrix} H_{1,1}(z) & H_{1,2}(z) & H_{4,3}(z) \\ H_{2,1}(z) & H_{2,2}(z) & H_{2,3}(z) \\ H_{3,1}(z) & H_{3,2}(z) & H_{3,3}(z) \end{bmatrix} \quad (5)$$

The determinant det[H(z)] of H(z) shown in Equation (5) above is expressed by Equation (6) below.

[Math. 6]

$$|H(z)| = \quad (6)$$
$$H_{1,1}(z)H_{2,2}(z)H_{3,3}(z) + H_{1,2}(z)H_{2,3}(z)H_{3,1}(z) + H_{1,3}(z)H_{2,1}(z)H_{3,2}(z) -$$
$$H_{1,3}(z)H_{2,2}(z)H_{3,1}(z) - H_{2,3}(z)H_{3,2}(z)H_{1,1}(z) - H_{1,2}(z)H_{2,1}(z)H_{3,3}(z)$$

Second Operation Example

Next, a second operation example of the wireless communication system 1 will be described using examples of specific functions of the transmission apparatus 2 and the reception apparatus 3. Here, the second operation example of the wireless communication system 1 in a case in which the number of antennas 20 included in the transmission apparatus 2 is N, the number of reception apparatuses 3 (the number of antennas 30) is M, and the number of antennas 20 differs from the number of antennas 30 will be described.

Figure 3:
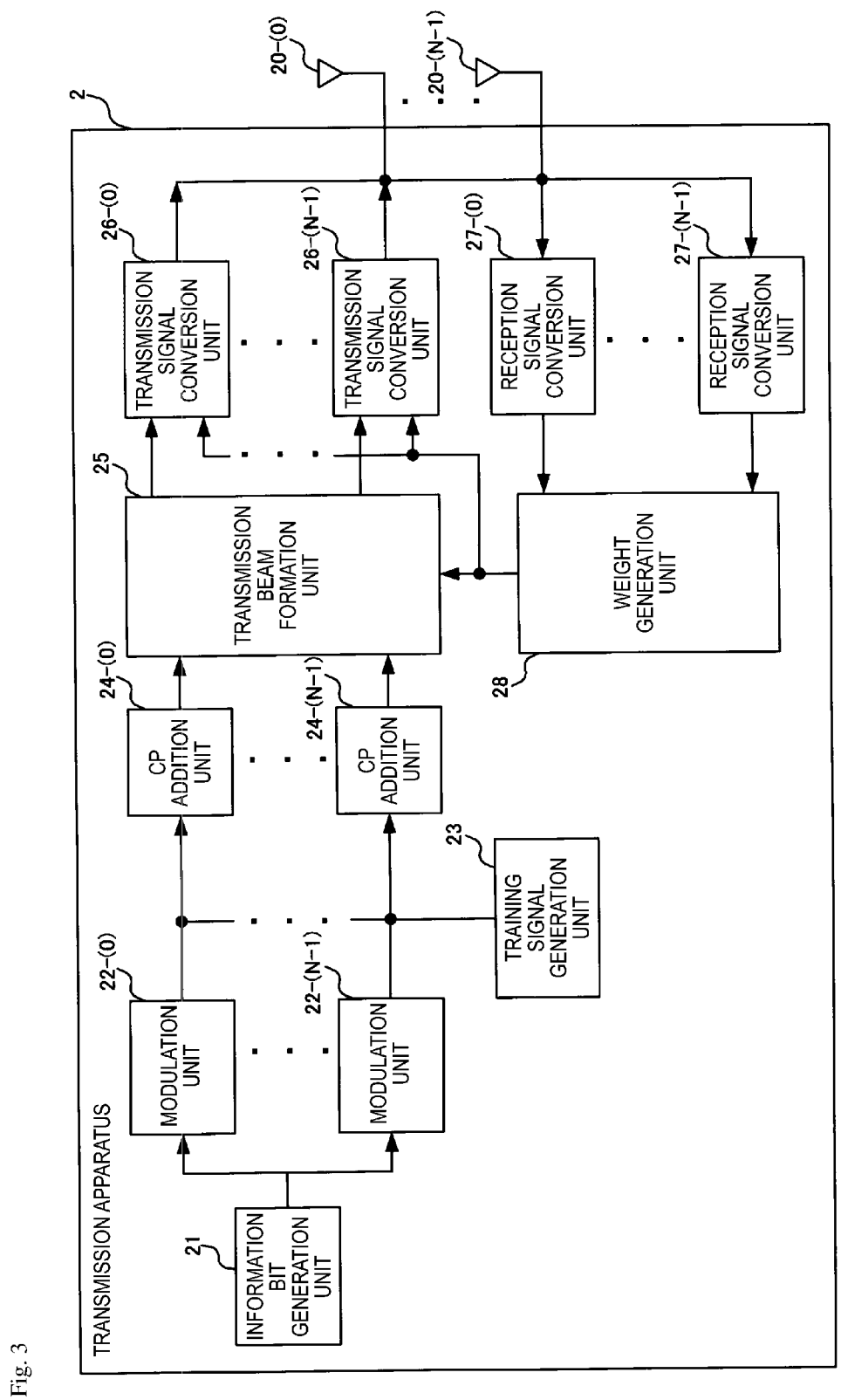
FIG. 3 is a functional block diagram illustrating a function of a transmission apparatus according to the embodiment.

FIG. 3 is a functional block diagram illustrating functions of the transmission apparatus 2 according to an embodiment. As illustrated in FIG. 3, the transmission apparatus 2 includes antennas 20-(0) to 20-(N−1), an information bit generation unit 21, modulation units 22-(0) to 22-(N−1), a training signal generation unit 23, CP addition units 24-(0) to 24-(N−1), the transmission beam formation unit 25, transmission signal conversion units 26-(0) to 26-(N−1), reception signal conversion units 27-(0) to 27-(N−1), and a weight generation unit 28.

The information bit generation unit 21 generates a data information bit for each user to be transmitted to the reception apparatus 3. The data information bit is, for example, a bit string corresponding to a data signal input from the outside (not illustrated), an internally generated data signal, or the like. The information bit generation unit 21 may have an error correction coding function or an interleaving function for generating an error correction code at a predetermined coding rate.

The modulation unit 22 outputs a data signal obtained by modulating the bit string for each user generated by the information bit generation unit 21 using a predetermined modulation scheme (for example, quadrature amplitude modulation (QAM)). The transmission apparatus 2 illustrated in FIG. 3 outputs the data signal obtained by modulating the bit string for each user generated by the information bit generation unit 21. The transmission apparatus 2 includes a modulation unit 22 corresponding to the number (N) of antennas 20.

The training signal generation unit 23 generates a known signal (referred to as a training signal) for estimating a channel impulse response (CIR: channel matrix), and outputs the known signal to the CP addition unit 24. The training signal is a predetermined signal obtained by modulating predetermined information such as a preamble for signal detection (for example, a specific pattern such as an alternating pattern of "0" and "1") using a modulation scheme less susceptible to interference, such as phase shift keying (PSK) and is used for the reception apparatus 3 to estimate the CIR. Information on the training signal transmitted by the transmission apparatus 2 is known to the reception apparatus 3 in advance.

The CP addition unit 24 adds a cyclic prefix (CP) to each symbol for the data signal output by the modulation unit 22 and the training signal output by the training signal generation unit 23 in order to remove symbol interference and the like.

The transmission beam formation unit 25 performs processing using the transmission weight W(z) generated by the weight generation unit 28 to be described below to form the FIR transmission beam for simultaneously removing symbol interference, inter-user interference, and the like on the transmission signal to which the CP addition unit 24 has added a CP. The transmission beam formation unit 25 may have a function of normalizing a transmission power.

The transmission signal conversion unit 26 includes a pulse shaping (which performs necessary band limitation using a roll-off filter or the like) unit, a digital to analog conversation (DAC) unit, a radio frequency (RF) unit, and the like, and performs processing for converting a signal output by the transmission beam formation unit 25 into a high-frequency signal and transmitting the high-frequency signal from the antenna 20.

Further, the transmission signal conversion unit 26 transmits information on the reception weight $W_R(z)$ generated by the weight generation unit 28 to the reception apparatus 3.

The respective data signals that the transmission beam formation unit 25 outputs to a plurality of reception apparatuses 3 are converted into high-frequency signals and transmitted from the respective antennas 20-(0) to 20-(N−1).

The reception signal conversion unit 27 includes an RF unit, an analog to digital conversion (ADC) unit, a pulse shaping unit, and the like, and frequency-converts a high-frequency reception signal received by each of the antennas 20-(0) to 20-(N−1) into a low-frequency baseband signal. Here, the reception signal conversion unit 27 receives a signal including information on CIR(H(z)) from each reception apparatus 3, converts the signal into a baseband signal, and outputs the baseband signal to the weight generation unit 28.

The weight generation unit 28 uses CIR(H(z)) estimated by a channel estimation unit 33 (to be described below) included in the reception apparatus 3 to calculate the transmission weight W(z) for the transmission beam formation unit 25 to perform the transmission beam formation processing and the reception weight $W_R(z)$ for the reception apparatus 3 to perform equalization processing. For example, the weight generation unit 28 multiplies the channel matrix by a pseudo-inverse matrix obtained by a predetermined number of iterative calculations to generate a diagonalizable transmission weight W(z).

The transmission weight W(z) is output to the transmission beam formation unit 25, and the reception weight $W_R(z)$ is transmitted to the reception apparatus 3 by the transmission signal conversion unit 26.

Here, the transmission weight W(z) generated by the weight generation unit 28 will be described in more detail.

The weight generation unit 28 generates the transmission weight W(z) so that the transmission beam formation unit 25 forms the FIR transmission beam for the non-square MIMO channel matrix.

For example, the weight generation unit 28 uses a Ben-Israel equation (see equation (51) shown in Chapter 7 of NPL 2 described above, for example) to calculate a transmission weight W(z) defined as Equation (7) below and obtain Equations (8) and (9) below.

[Math. 7]

$$W(z) \triangleq W_i(z) \qquad (7)$$

[Math. 8]

$$W_{i+1}(z) = 2W_i(z) - W_i(z)H(z)W_i(z) \qquad (8)$$

[Math. 9]

$$W_0(z) = \alpha H^H(z) \qquad (9)$$

α: Sufficiently small positive number
$(\cdot)^H$: Complex conjugate transpose

Here, the weight generation unit 28 performs i iterative calculations in which i is a sufficiently large number (number of times).

Figure 4:
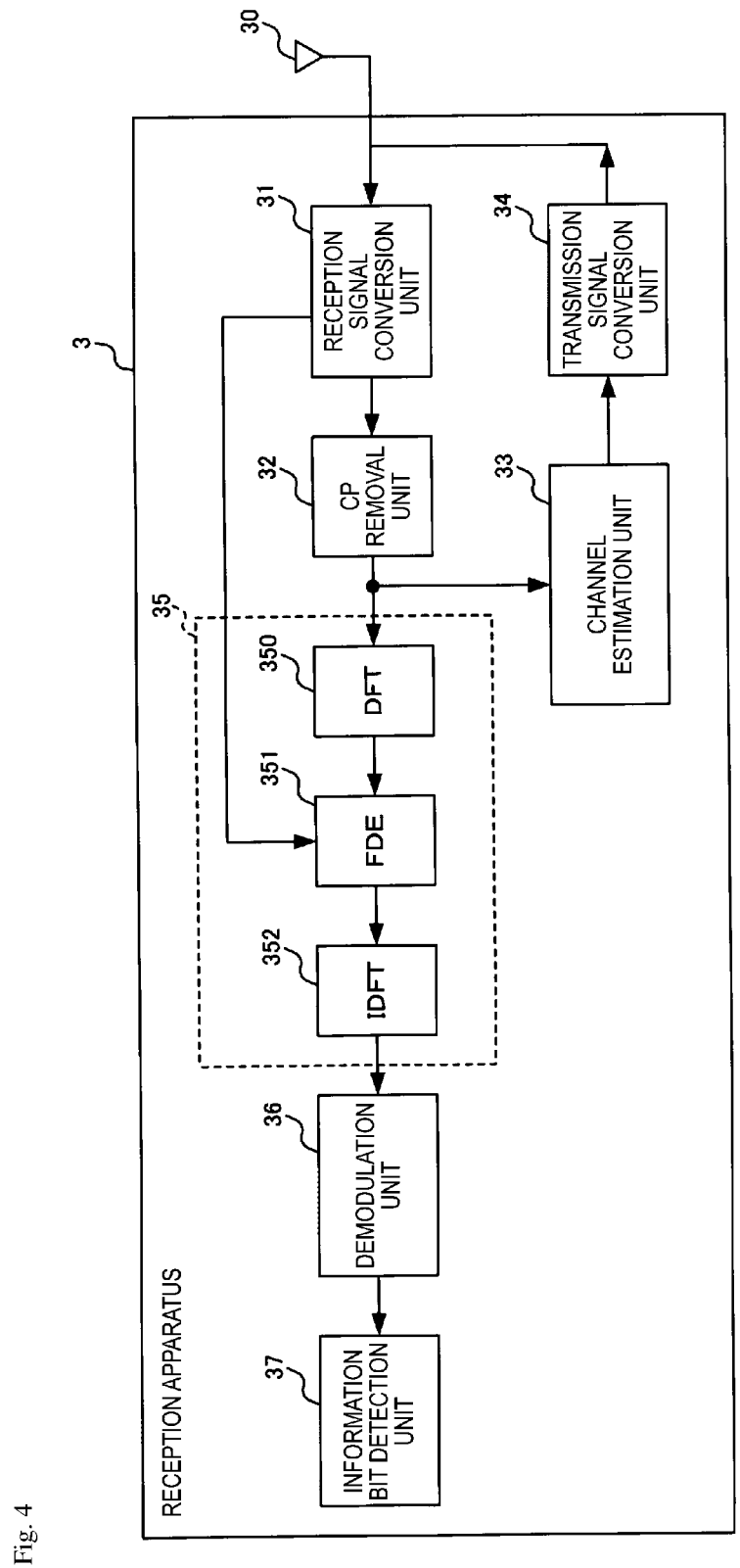
FIG. 4 is a functional block diagram illustrating a function of a reception apparatus.

FIG. 4 is a functional block diagram illustrating functions of the reception apparatus 3. As illustrated in FIG. 4, the reception apparatus 3 includes an antenna 30, a reception signal conversion unit 31, a CP removal unit 32, the channel estimation unit 33, a transmission signal conversion unit 34, an equalization unit 35, a demodulation unit 36, and an information bit detection unit 37.

The reception signal conversion unit 31 includes an RF unit, an ADC unit, a pulse shaping unit, and the like, like the reception signal conversion unit 27 included in the transmission apparatus 2, and frequency-converts the high-frequency signal received by the antenna 30 into a baseband signal.

Here, the reception signal conversion unit 31 outputs information on the reception weight $W_R(z)$ (det[H(z)]) received from the transmission apparatus 2 to a FDE 351 to be described below and outputs the data signal and the training signal received from the transmission apparatus 2 to the CP removal unit 32.

The reception signal conversion unit 31 may demodulate the information on the reception weight $W_R(z)$ and output the demodulated information to the FDE 351, or the FDE 351 may have a demodulation function.

The CP removal unit 32 performs processing for removing the CP added to the data signal and the training signal output by the reception signal conversion unit 31. The CP removal unit 32 outputs the data signal to the DFT 350 and outputs the training signal to the channel estimation unit 33.

The channel estimation unit 33 estimates a CIR based on the training signal transmitted from the transmission apparatus 2. For example, the channel estimation unit 33 included in the reception apparatus 3-(0) estimates CIR($H_{0,0}(z)$, $H_{1,0}(z)$, . . . , $H_{N-1,0}(z)$) between the antennas 20-(0) to 20-(N−1) included in the transmission apparatus 2 and the antenna 30-(0).

The channel estimation unit 33 outputs information on the estimated CIR to the transmission signal conversion unit 34. Similarly, the channel estimation units 33 of the reception apparatuses 3-(1) to 3-(M−1) estimate the CIRs between the respective antennas and output information on the estimated CIRs.

The transmission signal conversion unit 34 includes a pulse shaping unit, a DAC unit, an RF unit, and the like, like the transmission signal conversion unit 26 included in the transmission apparatus 2, converts, for example, the information on the CIR(H(z)) output by the channel estimation unit 33 into a high-frequency signal, and transmits the high-frequency signal from the antenna 30. The transmission signal conversion unit 34 may have a function of the modulation unit that modulates the CIR information into the baseband signal, or the channel estimation unit 33 may have the function.

The equalization unit 35 includes a discrete Fourier transform (DFT) 350, a frequency domain equalization (FDE) 351, and an inverse DFT (IDFT) 352, and performs equalization processing on the channel response of the reception signal.

The DFT 350 converts a data signal in a time domain output by the CP removal unit 32 into a data signal in a frequency domain through discrete Fourier transform processing.

The FDE 351 uses the reception weight $W_R(z)$ (det[H(z)]) generated by the weight generation unit 28 of the transmission apparatus 2 to perform equalization processing for removing symbol interference and the like on the signal output by the DFT 350. Here, for det[H(z)], inter-symbol interference is removed by dividing the data signal in the frequency domain by det[H(z)] subjected to DFT and converted into the frequency domain.

The IDFT 352 outputs a data signal obtained by converting the frequency domain signal output by the FDE 351 into the signal in the time domain to the demodulation unit 36.

The demodulation unit 36 demodulates the data signal output by IDFT 352 into information bits and outputs a bit string. The demodulation unit 36 may have an error correction and decoding function and a deinterleave function depending on a function of the transmission apparatus 2.

The information bit detection unit 37 outputs reception data obtained by converting the bit string output by the demodulation unit 36 into digital data. The information bit detection unit 37 may have an error correction and decoding function and a deinterleave function.

The wireless communication system 1 may be configured so that the reception apparatus 3 includes the weight generation unit 28 included in the transmission apparatus 2. Further, the wireless communication system 1 may be configured to perform the operation shown in the second operation example described above even when the number of antennas 20 included in the transmission apparatus 2 is the same as the number of reception apparatuses 3 (the number of antennas 30).

As described above, in the wireless communication system 1, because the transmission apparatus 2 or the reception apparatus 3 includes the weight generation unit 28 that multiplies the channel matrix by the pseudo-inverse matrix obtained by a predetermined number of iterative calculations to generate the diagonalizable transmission weight W(z), it is possible to form the FIR transmission beam and remove the symbol interference even when the number of the antennas 20 differs from the number of the antennas 30.

REFERENCE SIGNS LIST

1: Wireless communication system
2: Transmission apparatus
3-(0) to 3-(N−1): Reception apparatus
20-(0) to 20-(N−1): Antenna
21: Information bit generation unit 22-(0) to 22-(N−1): Modulation unit
23: Training signal generation unit
24-(0) to 24-(N−1): CP addition unit
25: Transmission beam formation unit
26-(0) to 26-(N−1): Transmission signal conversion unit
27-(0) to 27-(N−1): Reception signal conversion unit
28: Weight generation unit
30-(0) to 30-(M−1): Antenna
31: Reception signal conversion unit
32: CP removal unit
33: Channel estimation unit
34: Transmission signal conversion unit
35: Equalization unit
36: Demodulation unit
37: Information bit detection unit
350: DFT
351: FDE
352: IDFT

The invention claimed is:

1. A wireless communication system for performing transmission by SC-MIMO between a transmission apparatus including a plurality of antennas and a reception apparatus including the number of antennas different from the number of antennas of the transmission apparatus,
wherein the transmission apparatus includes
a training signal generation unit configured to generate a known signal predetermined;
a CP addition unit configured to add a CP to at least one symbol of a transmission signal including the known signal; and
a transmission beam formation unit configured to use a transmission weight to form a transmission beam for the transmission signal where the CP is added,
the reception apparatus includes
a CP removal unit configured to remove the CP added to a reception signal;
a channel estimation unit configured to estimate a channel matrix based on the known signal; and
an equalization unit configured to perform equalization processing on the reception signal where the CP is removed, and
the transmission apparatus or the reception apparatus further includes
a weight generation unit configured to multiply the channel matrix by a pseudo-inverse matrix obtained by a predetermined number of iterative calculations to generate the transmission weight that is diagonalizable.

2. A wireless communication method for performing transmission by SC-MIMO between a transmission apparatus including a plurality of antennas and a reception apparatus including the number of antennas different from the number of antennas of the transmission apparatus, the wireless communication method comprising:
generating, by the transmission apparatus, a known signal predetermined;
adding, by the transmission apparatus, a CP to at least one symbol of a transmission signal including the known signal;
removing, by the reception apparatus, the CP added to a reception signal;
estimating, by the reception apparatus, a channel matrix based on the known signal;
multiplying, by the transmission apparatus or the reception apparatus, the channel matrix by a pseudo-inverse matrix obtained by a predetermined number of iterative calculations to generate a transmission weight that is diagonalizable;
using, by the transmission apparatus, the transmission weight to form a transmission beam for the transmission signal where the CP is added; and
performing, by the reception apparatus, equalization processing on the reception signal where the CP is removed.

3. A transmission apparatus including the number of antennas different from a reception apparatus and performing transmission by SC-MIMO to and from the reception apparatus, the transmission apparatus comprising:
a training signal generation unit configured to generate a known signal predetermined;
a CP addition unit configured to add a CP to at least one symbol of a transmission signal including the known signal;
a weight generation unit configured to multiply, by a pseudo-inverse matrix obtained by a predetermined number of iterative calculations, a channel matrix estimated based on the known signal by the reception apparatus to generate a transmission weight that is diagonalizable; and
a transmission beam formation unit configured to use the transmission weight to form a transmission beam for the transmission signal where the CP is added.

* * * * *